Patented Apr. 21, 1925.

1,534,806

UNITED STATES PATENT OFFICE.

HENRY C. PARKER, OF CHICAGO, ILLINOIS.

PROCESS OF CARBONATING A LIQUID.

No Drawing.　　Application filed December 28, 1922.　Serial No. 609,509.

*To all whom it may concern:*

Be it known that I, HENRY C. PARKER, a citizen of the United States, residing at Chicago, in the county of Cook and State of Illinois, have invented a certain new and useful Improvement in Processes of Carbonating a Liquid, of which the following is a specification.

My invention relates to a process for carbonating a liquid and to a practical and usable combination of the necessary constituents for so doing. It has for one object the carbonation of beverages by the addition of chemical constituents, the primary purpose of which is to produce a gas (carbon dioxide) in just sufficient quantity to saturate the liquid at a given temperature and pressure, the quantity being predetermined in relation to the desired temperature and pressure at which the carbonation is to take place. A further object is the selection of the chemical constituents in such manner and their introduction into the liquid in such particular proportion, that the resulting byproducts shall remain in the smallest quantity consistent with the proper carbonation of the liquid, and shall be pleasing to the taste when mixed with the liquid. A further object is to provide chemical constituents such that the resulting byproducts shall be harmless when taken internally and shall produce no chemical reactions with other ingredients present in the liquid, which would result in deleterious or inferior products.

My process relates in general to the carbonation of a liquid by the introduction into that liquid of an acid and a salt of carbonic acid. The most effective way of reducing to a minimum the byproducts of such a combination is to reduce the weight of the alkaline constituent in the byproduct by using materials having a maximum proportion of available carbon dioxide. I therefore preferably employ the so called acid carbonates and preferably those of the lighter metals of the alkaline or alkaline earth groups such as sodium, potassium or lithium and calcium or magnesium. Of these sodium is the most available because of its low cost.

I further reduce the weight of the acid constituent in the byproduct by using materials having a maximum proportion of available or replaceable hydrogen and I therefore preferably use the polybasic acids, and preferably those containing a relatively light acid radical.

I am able to control the taste of the product and to prevent any interference by the byproducts with said taste by adding the chemical constituents in such particular proportion that they will produce as a byproduct a salt or mixture of salts having approximately the same hydrogen ion concentration as that possessed by the liquid. For instance a liquid which has a considerable acid concentration, such as a fruit juice, would require an acid salt or mixture of salts as a byproduct. A neutrally reacting liquid would require a salt giving a neutral reaction etc. There is one and only one definite proportion of chemical constituents which will produce as a byproduct a mixture of salts giving approximately the same hydrogen ion concentration as that of the liquid and therefore which will not interfere with the normal taste of the liquid. The use of this definite proportion is one of the novel features of this invention.

In addition I am able to control the taste of the product by the selection of the chemical constituents in such fashion that, in general, one of the constituents or a derivative thereof will be found already present in the liquid, before the carbonating process. Otherwise one of the constituents will form an agreeable combination with or possess a taste similar to one of the ingredients already present in the liquid. This selection, conforming to the above, is another novel feature of this invention. For example, I employ citric acid for the carbonation of lemon juice and phosphoric acid for the carbonation of cherry juice.

Since the majority of the possible reactions between the byproducts of the acids and carbonates I employ, and the constituents already in the liquids to be carbonated have already been worked out and are available to chemists, the effects of the resulting products on the human system have been determined. It is necessary only to guard against the use of acids or alkalies which are known to combine with the ingredients of the particular beverages to be carbonated in the formation of dangerous products in order to exclude the possibility of deleterious effects.

The byproducts of the acids or alkalies used are of course thoroughly known in their effects upon the human system, and it would be necessary merely for the chemist to avoid combinations which are known to produce dangerous byproducts.

The proportion in which the carbonating constituents should be joined or added to the liquid is determined by the hydrogen ion concentration of the liquid in question, the object being to produce a final carbonated product having hydrogen ion concentration as nearly as possible identical to that of the liquid before the carbonating process. The first step is to determine the concentration of the hydrogen ion in the liquid by any suitable method, the details of which of course form no part of the present invention. The second step is to determine the relative proportion of carbonating constituents necessary to give this required hydrogen ion concentration which, in general, is the problem of the salt of a weak acid (carbonic acid) mixed with a strong polybasic acid. The hydrogen ion concentration resulting from different proportions of the carbonating constituents may be calculated, for example, by application of the isohydric principle and from the ionization constants of the weak acid and the equations for the ionization of the hydrogen ions of the polybasic acid. Another method of determining this relative proportion is to determine the hydrogen ion concentration resulting from different proportions, directly, by means of the hydrogen electrode. The resultant drink closely approaches the original liquid with the advantage of being carbonated. The small amount of acid salt or mixture of salts, formed as a byproduct contributes a practically negligible change in the taste of the liquid and if the acid is properly chosen in relation to the constituents of the beverage the change, if any, may be a pleasing addition.

When the relative proportion of the carbonating constituents is known, the total amount required to carbonate a given volume of liquid under specified conditions of temperature, pressure and hydrogen ion concentration, may be either calculated or determined experimentally. It is important that no more than the required amount be added, in order that the resulting byproducts may be in as small quantity as possible. The amount required is that which will produce enough carbon dioxide to just saturate the liquid under the specified conditions and is conditioned by the solubility of the carbon dioxide under those conditions.

As a matter of convenience, the carbonating constituent may be put up in packages adapted to carbonate a given quantity, for example a quart, at a given temperature, for example, the temperature of ice water and the constituents may be prepared in the form of pellets and of one or more powders or in any other suitable way. While preferably sold in solid form, they may be liquid, solid or gaseous.

It is likewise evident that there are no restrictions imposed upon the time at which the various carbonating constituents may be added to the liquid. Thus, one of the constituents, for example the acid, may be added previously, while the carbonate may be added just before drinking. A particularly efficient method of employing my process consists in providing a fruit syrup or flavoring substance in which the acid constituent has already been incorporated, in a predetermined quantity. This syrup is then added to a determined quantity of water and finally the salts of carbonic acid may be added, when carbonation is desired. In this case the carbonating constituents are added in such proportion as to produce a hydrogen ion concentration similar to that of the theoretical drink which would be formed by adding the fruit syrup, minus the acid, directly to the determined quantity of water. A particularly usable form in which to add the salts of carbonic acid, to complete the above process, is that of a colloidal solution. The peculiar advantages of this colloidal solution are that the salts will not crystallize out upon evaporation; it can be made in more concentrated solution, thus reducing the bulk; and finally the reaction with the acid is delayed somewhat and gives time for the salts of carbonic acid to become thoroughly mixed throughout the liquid before the carbonizing power is exhausted. When the constituents are added in powder or pellet form it is advantageous to mix them with a neutral substance such as powdered sugar in order to delay their action upon each other. Separate powders may, of course, be used.

It will be understood that I do not limit myself to any specific form or arrangement of package, or any specific method of combining the carbonating ingredients, although I have already indicated several very efficient methods of carrying out my process.

I claim:

1. The process of carbonating a beverage wherein there is added to the beverage an acid carbonate and a polybasic acid in such particular proportion as to produce a hydrogen ion concentration substantially identical with that of the original liquid.

2. The process of carbonating a liquid which consists in introducing into said liquid a plurality of constituents, one of said constituents possessing a taste similar to that of one of the constituents already present in the liquid to be carbonated.

3. The process of carbonating a liquid which consists in the addition to said liquid of an acid carbonate and a polybasic acid, one of said constituents, or a derivative thereof, possessing a taste similar to that of one of the constituents already present in the liquid to be carbonated.

4. The process of carbonating a liquid which consists in adding to the liquid the chemical constituents necessary for carbonation in such quantity as just to saturate the liquid at atmospheric pressure, and at the temperature of ice water, and under the conditions of hydrogen ion concentration obtaining at the time of the addition.

5. The process of carbonating a liquid which consists in the addition to said liquid of an acid carbonate and a polybasic acid in such quantity as just to saturate the liquid at atmospheric pressure, and at the temperature of ice water, and under the conditions of hydrogen ion concentration obtaining at the time of the addition.

6. The process of carbonating a liquid which consists in adding to the liquid an acid flavoring substance and subsequently adding to the liquid a colloidal solution of an acid carbonate.

7. The process of carbonating a liquid which consists in adding to the liquid an acid flavoring substance and subsequently adding to the liquid an acid carbonate in a quantity sufficient just to saturate with carbon dioxide a predetermined volume of liquid at atmospheric pressure and at the temperature of ice water, and under the conditions of hydrogen ion concentration obtained at the time of the addition.

8. The process of carbonating a liquid which consists in adding to the liquid an acid flavoring substance and subsequently adding to the liquid a colloidal solution of an acid carbonate in a quantity sufficient just to saturate with carbon dioxide a predetermined volume of liquid at atmospheric pressure and at the temperature of ice water, and under the conditions of hydrogen ion concentration obtained at the time of the addition.

Signed at Chicago, county of Cook and State of Illinois, this 26th day of December, 1922.

HENRY C. PARKER.